United States Patent [19]

Chou et al.

[11] Patent Number: 5,415,791
[45] Date of Patent: May 16, 1995

[54] LUBRICATING COMPOSITION AND A SLIDING MEMBER COMPRISING THE COMPOSITION

[75] Inventors: Hideo Chou, Zama; Kikuo Sumiyoshi, Fujksawa; Keizou Ishikawa, Yamato, all of Japan; Yasunori Nishi, SE. Concord, N.C.

[73] Assignee: Oiles Corporation, Tokyo, Japan

[21] Appl. No.: 964,147

[22] Filed: Oct. 19, 1992

Related U.S. Application Data

[63] Continuation-in-part of Ser. No. 735,022, Jul. 25, 1991, abandoned.

Foreign Application Priority Data

Aug. 2, 1990 [JP] Japan ................................. 2-204011
Oct. 25, 1991 [JP] Japan ................................. 3-307059

[51] Int. Cl.⁶ ......................................... C10M 111/04
[52] U.S. Cl. ..................... 252/12; 252/12.2; 252/12.4; 252/12.6
[58] Field of Search .......... 252/12, 12.2, 12.4, 252/12.6; C10M 111/04

[56] References Cited

U.S. PATENT DOCUMENTS

| Re. 29,064 | 12/1976 | Morisaki | 252/12.6 |
|---|---|---|---|
| Re. 29,092 | 12/1976 | Schiefer et al. | 252/12.4 |
| 3,541,011 | 11/1970 | Davis et al. | 252/12.6 |
| 3,547,819 | 12/1970 | Davis et al. | 252/12.2 |
| 3,779,918 | 12/1973 | Ikeda et al. | 252/12.6 |
| 3,985,661 | 10/1976 | Ikeda et al. | 252/12.4 |
| 4,308,153 | 12/1981 | Mori | 252/12.2 |
| 4,357,249 | 11/1982 | Mellor | 252/12.2 |
| 4,486,319 | 12/1984 | Jamison | 52/12.2 |
| 4,505,987 | 3/1985 | Yamada et al. | 428/553 |
| 4,532,054 | 7/1985 | Johnson | 252/12.4 |
| 4,575,430 | 3/1986 | Periard et al. | 252/12.6 |
| 4,623,472 | 11/1986 | Jamison et al. | 252/12.2 |
| 4,655,944 | 4/1987 | Mori | 252/12.6 |
| 4,787,991 | 11/1988 | Morazumi et al. | 252/12.2 |
| 5,091,098 | 2/1992 | Tanaka et al. | 252/12.6 |

FOREIGN PATENT DOCUMENTS

| 0000697 | 2/1979 | European Pat. Off. |
| 0372559 | 6/1990 | European Pat. Off. |
| 0469906A1 | 2/1992 | European Pat. Off. |
| 51-36212 | 10/1976 | Japan |
| 52-5449 | 2/1977 | Japan |
| 56-14381 | 4/1981 | Japan |
| 1188716 | 7/1989 | Japan |
| 2018820 | 10/1979 | United Kingdom |
| 2223504 | 4/1990 | United Kingdom |

OTHER PUBLICATIONS

Database WPI Week 8050, Derwent Publications Ltd., London, GB AN 80-89258C & JP-A-55 139 429 (Oiless Kogyo KK), Abstract, Nov. 1, 1980.

*Primary Examiner*—Jerry D. Johnson
*Attorney, Agent, or Firm*—Nixon & Vanderhye

[57] ABSTRACT

Disclosed herein are a solid lubricating composition comprising a solid lubricant, a lubricating oil which is in a liquid or paste form at an ordinary temperature, a carrier for absorbing and possessing said lubricating oil, and a thermosetting synthetic resin binder, and a sliding member comprising a metal substrate and a solid lubricant composed of the lubricating composition.

31 Claims, 2 Drawing Sheets

LUBRICATING COMPOSITION AND A SLIDING MEMBER COMPRISING THE COMPOSITION

CROSS-REFERENCE TO A RELATED APPLICATION

This application is a continuation-in-part of U.S. application Ser. No. 735,022 filed Jul. 25, 1991, now abandoned.

BACKGROUND OF THE INVENTION

The present invention relates to a lubricating composition containing a lubricating oil, particularly to a lubricating composition used as being charged or being charged and coated on metal substrates in various forms, and a sliding member composed of the lubricating composition.

A sliding member in which a sliding surface of a metal substrate is charged and coated with a lubricating composition has been conventionally and widely used for various mechanical parts.

As an example, it is explained so-called solid lubricant-embedding sliding members in which apertures or grooves are formed to a metal substrate made of copper alloys or iron alloys and a solid lubricant is embedded and fixed in such apertures or grooves, have been used for various kinds of machine parts.

As a manufacturing method for the solid lubricant-embedding sliding member includes, a method (1) of using a round graphite rod having spiral ridges formed at the outer circumferential surface as a core in a casting mold, casting a molten metal into the casting mold, and removing the core by the cutting, thereby exposing the solid lubricant (graphite) spirally to the sliding surface (Japanese Patent Publication No 39-2506 (1964)); a method (2) of adhering and fixing solid lubricant pellets (cylindrical form) to paper or film which is burnt to be eliminated upon casting of a molten metal adhering and fixing the obtained solid lubricant pellets to the outer circumferential surface of a core rod composed of a shell sand mold to form a core in the casting mold (Japanese Patent Publication No 56-14381(1981)), or adhering and fixing solid lubricant pellets to a core rod composed of a shell sand mold to form a core for the casting mold (Japanese Patent Publication No 52-5449(1977)), casting a molten metal into the casting mold, thereby exposing the solid lubricant pellets on the sliding surface; or a method (3) of forming apertures or grooves to a metal substrate and embedding and fixing solid lubricant pellets coated with adhesives into the apertures or grooves, may be cited.

In the manufacturing methods described above, the method (1) has drawbacks that the molten metal can not extend sufficiently upon casting since graphite of good heat conductivity is used as it is for the core and the shape of the sliding member is restricted, and the method (2) has drawbacks that the solid lubricant pellets are detached or displaced during casting and it is difficult to obtain a sliding member in which the solid lubricant pellet are arranged regularly. Accordingly, the method (3) described in the above has been used generally.

However, the method (3) also involves several technical problems.

(a) Since the size of the apertures (aperture diameter) disposed in the metal substrate is different depending on the size of the metal substrates, the solid lubricant pellets embedded into such apertures having various sizes have to be prepared corresponding to the varying aperture thereof.

(b) Since it is difficult to automate the operation of embedding the solid lubricant pellets coated with adhesives and it has to be down manually, the workability is extremely poor.

(c) Since the solid lubricant pellets can not be used for embedding and fixing solid lubricant into grooves, for example, spiral grooves or ring-shaped grooves disposed in the inner surface of a metal substrate, in particular, a cylindrical metal substrate, it is necessary to provide a paste-like solid lubricant having a fluidity.

Further, as an additional problem, skin eruption or like of other unexpected accident may occur to operators during coating operation of adhesives to the solid lubricants in view of the item (b) described above.

Further, the following solid lubricant have been known:

A lubricant containing heat-molded composition comprising a polymeric synthetic resinous base material blended with a lubricant adsorbent carrier, the carrier having a lubricant adsorbed thereon, and molded, the carrier having a melting point or a melt viscosity higher than the base material, having a surface area of at least 0.01 $m^2/g$, and being selected from the group consisting of (1) a non-fusible inorganic material;
(2) a synthetic high molecular weight polymeric resinous material;
(3) a naturally occurring high molecular weight polymeric material; and
(4) mixtures thereof; and the base material being selected from the group consisting of a polymeric synthetic resin and a mixture of at least two polymeric synthetic resins (U.S. Pat. No. 3,778,918);

A sliding surface embedding-type solid lubricant comprising a solid lubricant powder, a thermosetting synthetic resin or an ordinary temperature setting-type synthetic resin which is liquid under an ordinary temperature for bonding the powdery particles and a lubricating oil impregnated between each of the powdery particles bonded by the synthetic resin (Japanese Patent Application Laid-Open (KOKAI) No. 58-160398(1983));

A composite lubricating material which can be molded into a desired shape and have a high surface strength, comprising 0.5 to 90.0% by weight of a pulverized, surface-treated and expanded graphite product (a+b) obtained by subjecting from 5 to 99.5% by weight of an expanded graphite powder (a) having an apparent specific gravity of 0.01 to 0.50 obtained by wet oxidation of natural graphite, kish graphite and artificial graphite, and then expanding and disintegrating them under a high temperature heat treatment, to surface treatment with 0.5 to 95.0% by weight of a lubricating oil (b), for example, turbine oil, machine oil, spindle oil and bearing oil, and 10 to 99.5% by weight of an organic binder (c) composed of a thermosetting synthetic resin such as phenol resin, melamine resin, epoxy resin and polyimide resin, or a thermoplastic synthetic resin such as polyphenylene sulfide, polyacetal, polytetrafluoroethylene, nylon 6, nylon 11 and polyurethane (Japanese Patent Application Laid-Open (KOKAI) No. 63-23993 (1988));

An extrudable or injection moldable self-lubricating composition comprising 100 parts by weight of a molding product composed of 99 to 10 parts by weight of a lubricating oil and 20 to 90 parts by weight of a super high molecular weight-polyethylene, and 0.1 to 20 parts by weight of a powder blended therewith (Japanese Patent Application Laid-Open (KOKAI) No. 63-161075 (1988)); and A composite bearing material comprising 0.1 to 10% by weight of fiber material having a good affinity for oil, 1 to 15% by weight of lubricating oil and the remainder of synthetic resin, with which pores and surfaces of a porous metallic layer provided on a metallic backing are impregnated and coated (U.S. Pat. No. 4,308,153).

The composite bearing material disclosed in the U.S. Patent '153 may contain 0.1 to 10% by weight of a solid lubricant such as graphite and 0.1 to 10% by weight of a metallic soap. The U.S. Patent '153 also discloses a thermoplastic resin as the synthetic resin and the actually used synthetic resin was polyacetal.

On the other hand, under the consideration of the performance of the sliding member, since the embedded solid lubricant is supplied little by little to the sliding surface to form a solid lubricant film, it can be served for the long time use without additionally supplying the lubricant. However, since the application use is substantially restricted to that in a low speed and high load region, the combined use with a lubricating oil is inevitable in an application use as being out of the above-mentioned region. In addition, the lubricant containing thermoplastic resin as disclosed in the patent '153 generally has low bonding strength to a metal substrate, resulting in detaching of the lubricant.

Accordingly, in the solid lubricant-embedding sliding member to be used in the application use out of the above-mentioned region, it is required to form grooves to the sliding surface as grease pits or to supply the lubricating oil from the oil feeding device to the sliding surface.

For the foregoing problems in view of manufacture and performance, the present inventors have considered that the all of the problems described above can be overcome thoroughly by satisfying all of the technical subjects, namely, (1) the lubricating composition can be embedded without restrictions at all, to the size and the shape of the apertures or grooves disposed in the metal substrate, (2) the solid lubricant embedded can provide both of the lubricating effect by the lubricating oil and the lubricating effect by the solid lubricant powder material and (3) the solid lubricant can be bonded to the apertures or grooves in the metal substrate, and as a result of an earnest study, it has been found that by blending a solid lubricant powder material with a lubricating oil which is in a liquid or paste-like form under an ordinary temperature, a carrier for absorbing and possessing the lubricating oil, and a thermosetting synthetic resin binder, the thus-obtained lubricating composition has a wettability and a fluidity, and the solid lubricant obtained therefrom is bonded to the apertures or grooves disposed in the metal substrate even if it contains the lubricating oil. On the basis of the finding, the present invention has been attained.

SUMMARY OF THE INVENTION

In the first aspect of the present invention, there is provided a lubricating composition comprising 5 to 78% by weight of a solid lubricant powder material, 5 to 30% by weight of a lubricating oil which is in a liquid or paste form at an ordinary temperature, 1 to 15% by weight of a carrier for absorbing and possessing said lubricating oil, and 15 to 50% by weight of a thermosetting synthetic resin binder.

In the second aspect of the present invention, there is provided a lubricating composition comprising 5 to 65% by weight of the solid lubricant powder material, 5 to 20% by weight of the lubricating oil, 1 to 8% by weight of the carrier, 10 to 30% by weight of the thermoplastic synthetic resin, and 25 to 50% by weight of the thermosetting synthetic resin binder.

In the third aspect of the present invention, there is provided a sliding member comprising a solid lubricant embedded into apertures or grooves of a metal substrate, said solid lubricant being obtained by flow-charging the lubricating composition defined in the first aspect into the apertures or grooves of the metal substrate and bonding the charged lubricating composition to the apertures or grooves of said metal substrate.

BRIEF DESCRIPTION OF THE ACCOMPANYING DRAWINGS

DETAILED DESCRIPTION OF THE INVENTION

Figure 1:
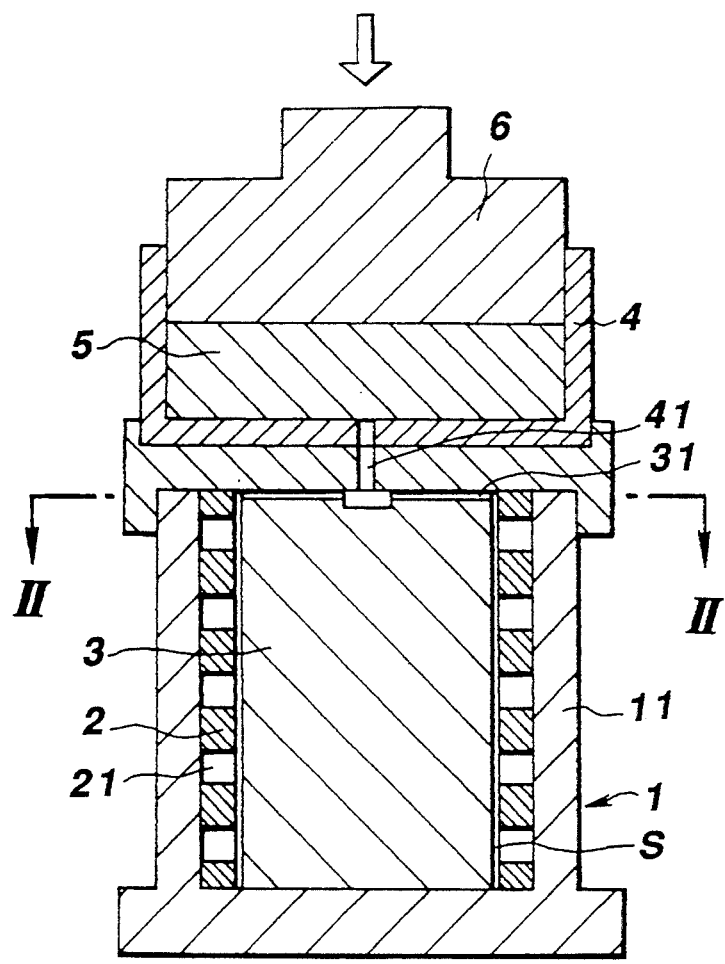
FIG. 1 is a vertical cross sectional view of one embodiment of a flow charging device for a lubricating composition.

In the present invention, the solid lubricant powder material is one having a solid lubricating function by itself. For example, one or more of materials selected from the group consisting of: (a) graphite such as (1) natural graphite, (2) artificial graphite obtained by molding an aggregate such as a coke powder using a binder such as coal tar pitch which is carbonized and graphitized by itself under heating and burning, baking the molded product a temperature of 700° to 1100° C., permeating an impregnating agent suck as pitch, and heat-treating at a temperature of 2500° to 3000° C. to graphitize the permeated product, and (3) an expanded graphite prepared by treating natural flaky graphite, kish graphite, thermally decomposable graphite or the like with a strong acid to form a inter-graphite layer compound followed by washing with water and then subjecting to an expanding treatment in the direction of the C-axis instantaneously at high temperature;

(b) fluorinated graphite;
(c) molybdenum disulfide;
(d) tungsten disulfide;
(e) boron nitride;
(f) calcium fluoride;
(g) polytetrafluoroethylene (PTFE);
(h) soft metals such as lead, tin, lead-tin alloy and indium; and
(i) metallic soaps such as fatty acid salts of lithium, calcium, aluminum and barium may be used. Among them, graphite, fluorinated graphite, molybdenum disulfide, boron nitride, polytetrafluoroethylene (PTFE), soft metals are preferred.

When fluorinated graphite, boron nitride, calcium fluoride, PTFE or metallic soap is used, since the thus-obtained lubricating composition has white colour, it is possible to colour a lubricating composition obtained by adding a slight amount of a colorant. By the coloured lubricating composition, undesirable image of black or gray colour of the solid lubricant in the sliding member used in fiber machines and food processing machines can be eliminated, resulting in giving a clean image to a sliding member.

A solid lubricant powder material having an average grain size of not more than 150 μm, more preferably 80 to 130 μm is preferred.

The blending amount of the solid lubricant powder material is determined as the balance of the lubricating oil, the carrier and the synthetic resin binder to be blended, and it is within a range from 5 to 78% by weight, preferably from 33 to 74% by weight, more preferably 47 to 67% by weight.

The lubricating oil which is liquid or paste under an ordinary temperature includes mineral oils such as machine oil and engine oil, vegetable oils such as castor oil, synthetic oils such as ester oil and silicone oil, and grease, and one or more of them are used.

When the lubricating oil is mixed with the solid lubricant powder material described above and the carrier for absorbing and possessing the lubricating oil, most of the lubricating oil is absorbed and possessed in the carrier and a portion thereof is adsorbed and retained at the surface of the solid lubricant powder material.

The blending amount of the lubricating oil is from 5 to 30% by weight, preferably from 8 to 20% by weight, more preferably 10 to 15% by weight. If it is blended in excess of 30% by weight, the adsorption amount of the lubricating oil to the surface of the solid lubricant powder material is increased and the lubricant oil is present at the bonding boundary between the solid lubricant and the apertures or the grooves in the metal substrate to weaken the bonding strength of the solid lubricant with the apertures or grooves in the metal substrate, thereby bringing about a defect in which the solid lubricant is drawn out of from the apertures or the grooves in the metal substrate. Further, if the blending amount is less than 5% by weight, although the bonding strength of the solid lubricant to the apertures or the grooves in the metal substrate is increased, the bleeding amount of the lubricating oil to the sliding surface is reduced, thereby failing to obtain an improvement for the sliding performance by the lubricating oil.

The carrier is blended with the solid lubricant powder material and the lubricating oil described above, and it has a characteristic of an absorbing and possessing the lubricating oil.

The carrier has a function of absorbing and possessing the lubricating oil, thereby increasing the flow viscosity of the lubricating oil, preventing to bleed out the lubricating oil, and supplying the lubricating oil which is uniformly dispersed and absorbed and possessed in the solid lubricant, to the sliding surface.

The carrier usable in the present invention includes (1) hydrocarbon wax, (2) a higher fatty acid, (3) a wax of a derivative of a higher fatty acid, (4) polyolefin powder, (5) oleophilic fiber, (6) crosslinked porous spherical particles mainly composed of styrene or methacrylic compound, (7) porous calcium carbonate, (8) phenol carbide resin and (9) a rubber oil-absorbing material. Among them, the hydrocarbon wax, the higher fatty acid, the wax of a derivative of a higher fatty acid, the polyolefin powder, and the crosslinked porous spherical particles mainly composed of styrene or methacrylic compound are preferred. They may be used alone or as a mixture of two or more of them.

(1) Hydrocarbon Wax:

The hydrocarbon wax includes a paraffin wax having not less than 24 of carbon atoms, an olefin wax having not less than 26 of carbon atoms and an alkylbenzene having not less than 28 of carbon atoms, and in addition, a crystalline microcrystalline wax can also be used.

(2) Higher Fatty Acid:

As the higher fatty acid, there can be mentioned a saturated fatty acid having not less than 14 of carbon atoms, for example, myristic acid, palmitic acid, stearic acid, arachic acid and montanic acid, as well as an unsaturated fatty acid having not less than 18 of carbon atoms, for example, octadecenic acid and parinanric acid.

(3) Wax of Derivative of Higher Fatty Acid:

As the wax, there can be mentioned, for example, (a) a higher fatty acid ester, (b) a higher fatty acid amide and (c) a higher fatty acid salt.

(a) Higher fatty acid ester:

As the higher fatty acid ester, there can be mentioned a methyl and ethyl ester of higher fatty acid having not less than 22 of carbon atoms, for example, ethyl behenate and methyl tricosane; an ester of a mono-valent higher fatty acid having not less than 16 of carbon atoms and a higher monohydric alcohol having not less than 15 of carbon atoms, for example, octadecyl stearate; a monodiglycerine ester of higher fatty acid having not less than 13 of carbon atoms, for example, 1,3-dilauric acid glyceride and monostearic acid glyceride; and a triglyceride of higher fatty acid having not less than 14 of carbon atoms.

(b) Higher fatty acid amide:

As the higher fatty acid amide, there can be mentioned, in particular, palmitic acid amide, stearic acid amide and oleic acid amide.

(c) Higher fatty acid salt:

As the higher fatty acid salt, there can be mentioned a salt with alkali and alkaline earth metal, for example, lithium stearate and calcium stearate.

(4) Polyolefin Powder:

As the polyolefin powder, there can be mentioned a super high molecular weight polyethylene powder, a high, medium and low density polyethylene powder and a polypropylene powder.

(5) Oleophilic Fiber:

As the oleophilic fiber, there can be mentioned a cellulose fiber and a polypropylene fiber.

(6) Crosslinked porous spherical particles mainly composed of styrene or methacrytic material:

As the porous spherical particles, there can be mentioned, for example, styrene-divinylbenzene copolymer.

(7) Porous Calcium Carbonate.

(8) Phenol Carbide Resin:

As the phenol carbide resin, there can be mentioned one having a carbon content of 94 to 99.8%, which is carbonized by heating resol resin or novolak resin at 1000 to 2000° C. in nitrogen gas atmosphere.

(9) Rubber Oil-absorbing Material:

As the rubber oil-absorbing material, there can be mentioned polyisobutylene, polybutadinene, styrenebutadiene copolymer rubber, ethylene-propylene copolymer rubber, ethylene-propylene terpolymer and polynorbornene synthetic elastomer.

The blending amount of the carrier is generally from 1 to 15% by weight, preferably 2 to 15% by weight, more preferably 3 to 12% by weight, still more preferably 3 to 8% by weight.

A preferred combination can be obtained for the bonding strength of the solid lubricant to the apertures or the grooves in the metal substrate and the lubricating property by setting the amount of the carrier toward the lower limit when the lubricating oil to be blended is on the side of the lower limit, whereas by setting the blending amount of the carrier toward the upper limit when the blending amount of the lubricating oil is on the side of the upper limit.

The thermosetting synthetic resin binder has roles of bonding the solid lubricant powder materials to each other and of bonding the solid lubricant with the apertures or the grooves in the metal substrate. As the synthetic resin binder, there can be mentioned a thermosetting synthetic resin such as epoxy resin, modified epoxy resin, phenol resin, phenoxy resin and alkyd resin, and the epoxy resin is preferred in the present invention.

As the epoxy resin, an ordinary temperature-setting liquid epoxy resin and a thermosetting liquid or powdery epoxy resin is used.

Specifically, as the ordinary temperature-setting epoxy resin, there can be mentioned a two-component epoxy resin of "Cemedyne" (trade name, produced by Cemedyne Co.).

Further, as the thermosetting liquid epoxy resin, there can be mentioned a one component epoxy resin of "Technodyne" (trade name, produced by Taoka Kagaku Co.), a liquid epoxy resin "Epicoat" (trade name, produced by Yuka Shell Epoxy Co.), a latent curing agent "Novacure" (trade name, produced by Asahi Kasei Industry Co.) and "Amicure" (trade name, produced by Ajinomoto Co.).

As the thermosetting powdery epoxy resin, there can be mentioned "Epiform" (trade name, manufactured by Somal Co.), and the powdery epoxy resin may also be used as a flow controlling agent for the liquid epoxy resin.

The blending amount of the thermosetting synthetic resin is from 15 to 50% by weight, preferably 15 to 35% by weight, more preferably 20 to 30% by weight.

If the blending amount of the thermosetting synthetic resin is less than 15% by weight, the binding effect of the binder would not be sufficiently exhibited, thereby drawing out of from the apertures or the grooves in the metal substrate when sliding member is produced. Further, if the blending amount exceeds 50% by weight, although bonding strength of the solid lubricant to a metal substrate or mechanical strength of the solid lubricant is enhanced, the lubricating properties of the solid lubricant tends to be impaired.

The lubricating composition may further contain a thermoplastic synthetic resin.

The thermoplastic synthetic resin may be added to the lubricating composition described above for enhancing the strength of the solid lubricant which is embedded into metal substrates in various forms and for enhancing the effect as a binder of the thermosetting synthetic resin binder.

The thermoplastic synthetic resin which does not tends to impair the lubricating properties of the solid lubricant and the lubricating oil in the lubricating composition is preferably used. The preferred thermoplastic synthetic resin includes aliphatic polyamide such as nylon 6, nylon 66, nylon 11 and nylon 12, aromatic polyamide, polyacetal, polyether ether ketone (PEEK), polyphenylene sulfide (PPS), polybutyrene telephthalate (PBT) and oxybenzoyl polyester. One or more of the thermoplastic synthetic resins may be used.

The thermoplastic synthetic resin may be used in a powder form, a fiber form or a woven fabric tip form, depending on the intended use.

The blending amount of the thermoplastic synthetic resin is generally from 10 to 30% by weight, preferably 10 to 20% by weight.

If the blending amount of the thermoplastic resin is less than 10% by weight, it is difficult to attain the above-mentioned effect of the addition of the thermoplastic synthetic resin. Further, if the blending amount exceeds 30% by weight, the lubricating properties of the solid lubricant powder material and the lubricating oil in the solid lubricant tends to be impaired.

When the thermoplastic synthetic resin is contained therein, a lubricating composition comprising 5 to 65% by weight, more preferably 15 to 45% by weight of the solid lubricant powder material, 5 to 20% by weight, more preferably 8 to 15% by weight of the lubricating oil, 1 to 8% by weight, more preferably 1.6 to 6% by weight of the carrier, 10 to 30% by weight, more preferably 10 to 20% by weight of the thermoplastic synthetic resin binder, and 25 to 50% by weight, more preferably 25 to 43% by weight of the thermosetting synthetic resin binder is preferred.

The lubricating composition in the present invention can be prepared as shown below.

A carrier absorbing and possessing the lubricating oil is blended and mixed with a solid lubricant powder material and optionally a thermoplastic synthetic resin, and then the lubricating oil is blended and mixed with the thus-obtained mixture. Then, a thermosetting synthetic resin binder is added to the resultant mixture of the solid lubricant powder material, the carrier, the lubricating oil and optionally the thermoplastic synthetic resin, and they are kneaded to obtain a lubricating composition having a wettability and a fluidity. In addition to liquid thermoplastic synthetic resin, a thermosetting synthetic resin powder may be added during kneading for controlling the fluidity of the lubricating composition.

The thus obtained lubricating composition having a wettability and a fluidity is flow-charged at an ordinary temperature or under the heating (e.g., 20° to 40° C.) under a pressure of 50 to 300 kgf/cm$^2$ into the apertures or the grooves disposed in the metal substrate, and subsequently, the thermosetting synthetic resin binder therein is cured at an ordinary temperature or under the heating (e.g., 80° to 160° C.) to bond the lubricating composition containing the lubricating oil with the apertures or the grooves in the metal substrate, thereby obtaining a sliding member embedded with a solid lubricant containing the lubricating oil. As a method of flow-charging the lubricating composition having a wettability and a fluidity into the apertures or the grooves disposed in the metal substrate, transfer molding, compression molding, injection molding or the like may be used. In case of a plate-like sliding member, there can be used a method of previously molding the lubricating composition into a plate-like shape, placing the thus-obtained plate-like solid lubricant on a plate-like sliding part formed with apertures of grooves and then flow-charging the lubricating composition by press molding or roll molding.

Figure 2:
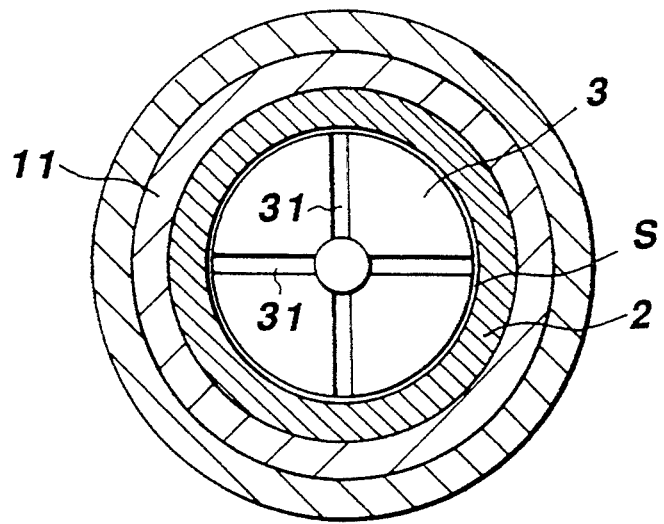
FIG. 2 is a cross sectional view taken along line II—II in FIG. 1.

FIG. 1 is a cross sectional view illustrating one embodiment of a flow-charging device for the lubricating composition and FIG. 2 is a cross sectional view taken along line II—II in FIG. 1.

In the drawing, there are illustrated a holder 1 having a cylindrical portion 11; a sliding member material (metal substrate) 2 fitted into the cylindrical portion 11 of the holder 1 with its outer circumferential surface to be constrained, and having apertures 21 formed such that they are overlapped to each other in the outer circumferential direction; a guide member 3 having a radial flow channel 31 formed at the upper end surface and inserted to the inner surface of the sliding member material 2 with a slight gap S relative to the inner diametrical surface of the material 2; a vessel 4 fitted to the upper end of the cylindrical portion 11 of the holder 1 which holds the material 2 and having a flow channel 41 in communication with the flow channel 31; a lubricating composition 5 having a wettability and a fluidity charged in the vessel 4; and a pressing tool 6 fitted vertically movably in the vessel 4.

Figure 3:
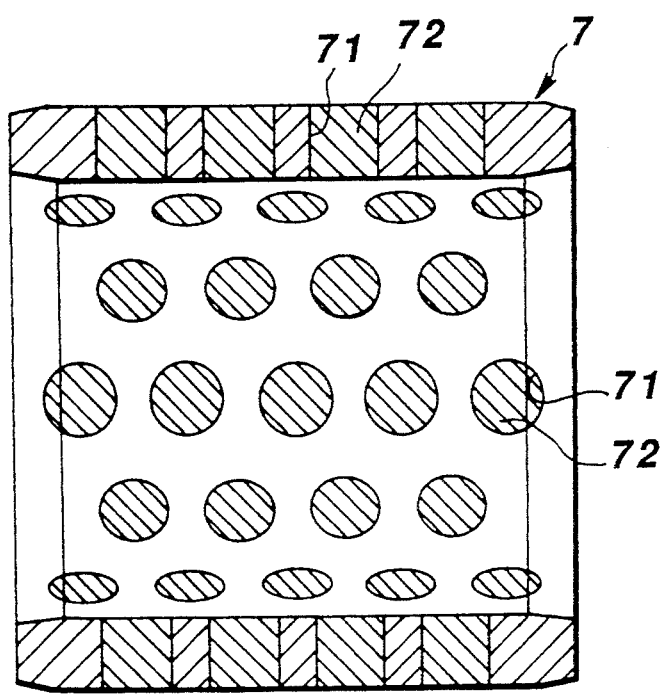
FIG. 3 is a vertical cross sectional view illustrating a sliding member comprising a metal substrate and a solid lubricant charged therein and composed of a lubricating composition.

FIG. 3 is a cross sectional view illustrating a solid lubricant-embedding sliding member manufactured by using the apparatus as described above, in which are shown a sliding member 7, apertures 71 formed in the sliding member material and solid lubricant 72 embedded in the apertures 71.

The bonding strength between the solid lubricant and the metal substrate in the sliding member having the solid lubricant embedded therein according to the present invention is not less than 50 kgf/cm$^2$. At a 200 mm stroke of a reciprocating sliding test and after $100 \times 10^4$ of test cycles (400 Km test stroke), by using the mechanical structural carbon steel (S45C) as the mating member, (1) a friction coefficient is not more than 0.135, preferably not more than 0.115 and the abrasion amount is not more than 0.0125 mm, preferably not more than 0.012 mm under a load of 500 kgf/cm$^2$ and at a sliding speed at 1 m/min; and (2) a friction coefficient is not more than 0.125, preferably not more than 0.105 and abrasion amount is not more than 0.0105 mm, preferably not more than 0.0085 mm under a load at 10 kgf/cm$^2$ and at a sliding speed at 40 m/min.

The solid lubricant and the sliding member according to the present invention have effects as described below.

(1) Since the lubricating composition has a wettability and a fluidity, it can be embedded without restriction at all of the shape of the apertures or grooves disposed in the metal substrate.

(2) Since the solid lubricant obtained from the lubricating composition contains in itself a lubricating oil, the lubricating oil possessed by the carrier in the solid lubricant is supplied to the sliding surface during sliding movement relative to the mating member in the solid lubricant-embedding sliding member, the wettability by the lubricating oil can be possessed, by which lubricating effect of the solid lubricant and the lubricating oil can be conducted. Accordingly, it is no more necessary to supply additional lubricant such as grease to the sliding surface as in the prior art for the solid lubricant-embedding sliding member under a low speed and high load condition, as well as for the application use out of such conditions, and the use under wide range of conditions is enabled.

(3) Since the lubricating oil is absorbed and possessed in the carrier, the bleeding out thereof is extremely small and a great amount of the lubricating oil is contained in the solid lubricant.

(4) Since the lubricating composition is embedded by flow charging into the apertures or the grooves disposed in the metal substrate, conventional adhesive coating operation or embedding operation in the prior art is no more necessary to remarkably improve the operability, as well as troubles such as skin eruption of operators caused by the adhesive coating operation can be overcome thoroughly.

EXAMPLES

The lubricating composition and the sliding member having the solid lubricant embedded therein according to the present invention will be explained more in details referring to examples.

EXAMPLE I (1) 53% by weight of an artificial graphite powder obtained by pulverizing an artificial porous graphite molding product having an apparent specific gravity of 1.55 g/cm$^3$ and a porosity of 45% (manufactured by Ibiden Co.), and preparing to an average grain size of 100 μm, (2) 43% by weight of the artificial graphite powder described in (1) above and 10% by weight of a polytetrafluoroethylene (PTFE) powder ("Yunon" (trade name), manufactured by Nippon Vulker Co.), and (3) 43% by weight of the artificial graphite powder as described in (1) above and 10% by weight of a molybdenum disulfide powder, were used as the solid lubricant powder material; 5% by weight of a hydrocarbon wax ("Godeswax" (trade name), manufactured by Nikko Fine Products Co.) as a carrier were added with the solid lubricant powder material by a mixer; and 15% weight of a mineral oil as a lubricating oil ("Daffny Super Multi" (trade name), manufactured by Idemitsu Kosan Co.) were mixed with the resultant mixture to obtain a mixture of the solid lubricant powder material, the carrier and the lubricating oil.

Then, 16% by weight of a thermosetting liquid epoxy resin ("Epicoat" (trade name), manufactured by Showa Shell Chemical Co.) as a thermosetting synthetic resin binder, 5% by weight of a latent-type setting agent ("Novacure" (trade name), manufactured by Asahi Kasei Industry Co.) and 6% by weight of a powdery epoxy resin ("Epiform" (trade name), manufactured by Somal Co. ) for flow control were mixed with the thus-obtained mixture and then kneaded to obtain a lubricating composition having a wettability and a fluidity.

A high strength brass casting product (JIS-H2205) was used as the metal substrate, which was fabricated by cutting into a cylindrical substrate of 60 mm in inner diameter, 80 mm in outer diameter and 80 mm in length, and 54 apertures each of 10 mm in diameter were formed to the cylindrical substrate so as to overlap to each other in the circumferential direction of the cylindrical substrate to form a sliding member material.

While constraining the sliding member material at the outer circumferential surface, the lubricating composition was caused to flow at an ordinary temperature under a pressure of 50 kg/cm$^2$ from the inner circumferential surface of the material by the flow discharging device shown in FIG. 1 and was tightly charged into the apertures of the material.

Subsequently, the sliding member material having the lubricating composition held in the apertures was kept in a heating furnace to a temperature of 80° C. for 60 min to conduct primary setting for the thermosetting synthetic resin binder and then further kept in the heating furnace to a temperature of 140° C. for 30 min to conduct the secondary setting for the thermosetting synthetic resin binder. At the same time, the lubricating composition containing the lubricating oil was bonded to the apertures of the material, thereby obtaining the sliding member having the solid lubricant embedded therein (bearing bush).

EXAMPLE II (1) 40% by weight of an expanded graphite powder obtained by pulverizing an expanded graphite sheet having an apparent specific gravity of 0.7 g/cm$^3$ and a thickness of 0.5 mm ("Nikafilm" (trade name), manufactured by Nippon Carbon Co.), and preparing to an average grain size of 120 $\mu$m.

(2) 20% by weight of the expanded graphite powder, and 20% by weight of the artificial graphite powder, and (3) 20% by weight of the expanded graphite powder and 20% by weight of a boron nitride powder, were used as the solid lubricant powder material; 8% by weight of a higher fatty acid (stearic acid) was added as a carrier to the solid lubricant powder material and mixed by a mixer; and 17% by weight of a mineral oil as a lubricating oil (same as in Example I) were mixed with resultant mixture to obtain a mixture of the solid lubricant powder material, the support or the carrier and the lubricating oil.

Then, 21% by weight of a thermosetting liquid epoxy resin (same as in Example I) as a thermosetting synthetic resin binder, 6% by weight of a latent type curing or setting agent (same as in Example I) and 8% by weight of a powdery epoxy resin (same as in Example I) for flow control were mixed with the thus-obtained mixture and then kneaded to obtain a lubricating composition having a wettability and a fluidity.

After manufacturing a sliding member material by using the same high strength brass casting product as in Example I as the metal substrate, the lubricating composition was tightly charged in the apertures of the material in the same procedures as those in Example I.

Subsequently, the solid lubricant-embedding sliding member was obtained in the procedures as those in Example I.

EXAMPLE III (1) 35% by weight of the same artificial graphite powder as in Example I, (2) 20% by weight of the artificial graphite powder and 15% by weight of a polytetrafluoroethylene powder (as in Example I), and (3) 20% by weight of the artificial graphite powder and 15% by weight of a molybdenum disulfide powder, were used as the solid lubricant powder material; 7% by weight of a super high molecular weight polyethylene powder ("Hizexmillion" (trade name), manufactured by Mitsui Petrochemical Industry Co.), 3% by weight of a higher fatty acid amide (mixture of oleic acid and stearic acid) were added as a carrier to the solid lubricant powder material and mixed by a mixer; and 20% by weight of a mineral oil as a lubricating oil (same as in Example I) were mixed with the resultant mixture to obtain a mixture of the solid lubricant powder material, the support or the carrier and the lubricating oil.

Then, 21% by weight of a thermosetting liquid epoxy resin (same as in Example I) as the thermosetting synthetic resin binder, 6% by weight of a latent type setting agent (same as in Example I) and 8% by weight of a powdery epoxy resin (same as in Example I) for flow control were mixed with the thus-obtained mixture and then kneaded to obtain a lubricating composition having a wettability and a fluidity.

After manufacturing a sliding member material by using the same high strength brass casting product as in Example I as the metal substrate, the lubricating composition was tightly charged in the apertures of the material in the same procedures as those in Example I.

Subsequently, the solid lubricant-embedding sliding member was obtained in the same procedures as those in Example I.

EXAMPLE IV (1) 70% by weight of a molybdenum disulfide powder, (2) 60% by weight of the molybdenum disulfide powder and 10% by weight of a polytetrafluoroethylene powder (as in Example I), were used as the solid lubricant powder material; 5% by weight of a hydrocarbon wax (the same as in Example I) was added as a carrier to the solid lubricant powder material and mixed by a mixer; and 8% by weight of mineral oil as a lubricating oil (same as in Example I) were mixed with the thus-obtained mixture to obtain a mixture of the solid lubricant powder material, the support or the carrier and the lubricating oil.

Then, 11% by weight of a thermosetting liquid epoxy resin (same as in Example I) as a thermosetting synthetic resin binder, 3% by weight of a latent type setting agent (same as in Example I) and 4% by weight of a powdery epoxy resin (same as in Example I) for flow control were mixed with the thus-obtained mixture and then kneaded to obtain a lubricating composition having a wettability and a fluidity.

After manufacturing a sliding member material by using the same high strength brass casting product as in Example I as the metal substrate, the lubricating composition was tightly charged in the apertures of the material in the same procedures as those in Example I.

Subsequently, the solid lubricant-embedding sliding member was obtained in the same procedures as those in Example I.

EXAMPLE V (1) 53% by weight of the same artificial graphite powder as in Example I, (2) 43% by weight of the artificial graphite powder and 10% by weight of a polytetrafluoroethylene (PTFE) powder (same as in Example I), and (3) 43% by weight of the artificial graphite powder and 10% by weight of a boron nitride powder were used as the solid lubricant powder material; 5% by weight of a porous styrene-divinylbenzene copolymer powder ("Techpolymer" (trade name) manufactured by Sekisui Kaseihin Kogyo Co.) as a carrier were added with the solid lubricant powder material by a mixer; and 15% by weight of a mineral oil as a lubricating oil (same as in Example I) were mixed with the resultant mixture to obtain a mixture of the solid lubricant powder material, the support or the carrier and the lubricating oil.

Then, 16% by weight of a thermosetting liquid epoxy resin (same as in Example I) as a thermosetting synthetic resin binder, 5% by weight of a latent type setting agent (same as in Example I) and 6% by weight of powdery epoxy resin (same as in Example I) for flow control were mixed with the resultant mixture and then kneaded to obtain a lubricating composition having a wettability and a fluidity.

After manufacturing a sliding member material by using the same high strength brass casting product as in Example I as the metal substrate, the lubricating composition was tightly charged in the apertures of the material in the same procedures as those in Example I.

Subsequently, the solid lubricant-embedding sliding member was obtained in the same procedures as those in Example I.

EXAMPLE VI

As a solid lubricant powder material, 16% by weight of polytetrafluoroethylene powder (PTFE) and 13% by weight of boron nitride were used; 11% by weight of an aromatic polyamide ("Cornex" (trade name), manufactured by Teijin Corporation) as a thermoplastic synthetic resin and 4% by weight of a hydrocarbon wax ("Godeswax" (trade name), manufactured by Nikko Fine Products Co.) as a carrier were added with the above-mentioned solid lubricant powder material by a mixer; and 13% by weight of a mineral oil as a lubricating oil ("Daffny Super Multi" (trade name), manufactured by Idemitsu Kosan Co.) were mixed with the resultant mixture to obtain a mixture of PTFE, boron nitride, the aromatic polyamide, the hydrocarbon wax and the mineral oil.

Then, 26% by weight of a thermosetting liquid epoxy resin ("Epicoat" (trade name), manufactured by Showa Shell Chemical Co.) as a thermosetting synthetic resin binder, 7% by weight of a latent-type setting agent ("Novacure" (trade name), manufactured by Asahi Kasei Industry Co.) and 10% by weight of a powdery epoxy resin ("Epiform" (trade name), manufactured by Somal Co. ) for flow control were mixed with the thus-obtained mixture and then kneaded to obtain a lubricating composition having a wettability and a fluidity. The lubricating composition had white colour.

A high strength brass casting product (JIS-H2205) was used as a metal substrate, which was fabricated by cutting into a cylindrical substrate of 60 mm in inner diameter, 80 mm in outer diameter and 80 mm in length, and 54 apertures each of 10 mm in diameter were formed to the cylindrical substrate so as to overlap to each other in the circumferential direction of the cylindrical substrate to form a sliding member material.

While constraining the sliding member material at the outer circumferential surface, the lubricating composition was caused to flow at an ordinary temperature under a pressure of 150 kg/cm$^2$ from the inner circumferential surface of the material by the flow discharging device shown in FIG. 1 and was tightly charged into the apertures of the material.

Subsequently, the sliding member material having the lubricating composition held in the apertures was kept in a heating furnace to a temperature of 80° C. for 60 min to conduct primary setting for the thermosetting synthetic resin binder and then further kept in the heating furnace to a temperature of 140° C. for 30 min to conduct the secondary setting for the thermosetting synthetic resin binder. At the same time, the lubricating composition containing the lubricating oil was bonded to the apertures of the material, thereby obtaining the sliding member having the solid lubricant embedded therein (bearing bush). The obtained sliding member was one in which 54 pieces of the white solid lubricants were charged and bonded to a high strength brass material having gold colour.

EXAMPLE VII

As a solid lubricant powder material, 16% by weight of PTFE and 13% by weight of boron nitride were used; 11% by weight of an aliphatic polyamide (nylon 12) as a thermoplastic synthetic resin and 4% by weight of a hydrocarbon wax (same as in Example VI) as a carrier were added with the solid lubricant powder material by a mixer; and 13% weight of a mineral oil as a lubricating oil (same as in Example VI) were mixed with the resultant mixture to obtain a mixture of PTFE, boron nitride, the polyamide, the hydrocarbon wax and the mineral oil.

Then, 26% by weight of a thermosetting liquid epoxy resin (same as in Example VI) as a thermosetting synthetic resin binder, 7% by weight of a latent type curing or setting agent (same as in Example VI) and 10% by weight of a powdery epoxy resin (same as in Example VI) for flow control were mixed with the thus-obtained mixture and then kneaded to obtain a lubricating composition having a wettability and a fluidity. The lubricating composition had white colour.

The same high strength brass casting product as in Example VI was used as a metal substrate, it was fabricated into a cylindrical substrate having the same dimension and 54 apertures were formed so as to overlap to each other in the circumferential direction of the cylindrical substrate to form a sliding member material.

Subsequently, the solid lubricant-embedding sliding member (bearing bush) was obtained in the procedures as those in Example VI. The obtained sliding member was one in which 54 pieces of the white solid lubricants were charged and bonded to a high strength brass material having gold colour.

EXAMPLE VIII

As a solid lubricant powder material, 16% by weight of PTFE and 13% by weight of boron nitride were used; 11% by weight of aromatic polyamide fibers (diameter: 15 μm, length: not more than 3 mm, "Cornex" (trade name), manufactured by Teijin Corporation) as a thermoplastic synthetic resin and 4% by weight of a hydrocarbon wax (same as in Example VI) as a carrier were added with the solid lubricant powder material by a mixer; and 13% weight of a mineral oil as a lubricating oil (same as in Example VI) were mixed with the resultant mixture to obtain a mixture of PTFE, boron nitride, the aromatic polyamide fiber, the hydrocarbon wax and the mineral oil.

Then, 25% by weight of a thermosetting liquid epoxy resin (same as in Example VI) as the thermosetting synthetic resin binder, 8% by weight of a latent type setting agent (same as in Example VI) and 10% by weight of a powdery epoxy resin (same as in Example VI) for flow control were mixed with the thus-obtained mixture and then kneaded to obtain a solid lubricant having a wettability and a fluidity. The lubricating composition had white colour.

The same high strength brass casting product as in Example VI was used as a metal substrate, it was fabricated into a cylindrical substrate having the same dimension and 54 apertures were formed so as to overlap to each other in the circumferential direction of the cylindrical substrate to form a sliding member material.

Subsequently, the solid lubricant-embedding sliding member (bearing bush) was obtained in the procedures as those in Example VI. The obtained sliding member was one in which 54 pieces of the white solid lubricants were charged and bonded to a high strength brass material having gold colour.

EXAMPLE IX

As a solid lubricant powder material, 16% by weight of fluorinated graphite and 18% by weight of PTFE were used; 13% by weight of a polyether ether ketone powder ("Victolex" (trade name), manufactured by ICI Japan Co.) as a thermoplastic synthetic resin and 4% by weight of stearic acid as a carrier were added with the solid lubricant powder material by a mixer; and 13% by weight of a mineral oil as a lubricating oil (same as in Example VI) were mixed with the resultant mixture to obtain a mixture of fluorinated graphite, PTFE, polyether ether ketone, stearic acid and the mineral oil.

Then, 30% by weight of a thermosetting liquid epoxy resin ("Technodyne AH604W" (trade name), manufactured by Taoka Kagaku Co.) as the thermosetting synthetic resin binder and 6% by weight of a powdery epoxy resin (same as in Example VI) were mixed with the thus-obtained mixture and then kneaded to obtain a solid lubricant having a wettability and a fluidity. The lubricating composition had white colour.

The same high strength brass casting product as in Example VI was used as a metal substrate, it was fabricated into a cylindrical substrate having the same dimension and 54 apertures were formed so as to overlap to each other in the circumferential direction of the cylindrical substrate to form a sliding member material.

Subsequently, the solid lubricant-embedding sliding member (bearing bush) was obtained in the procedures as those in Example VI. The obtained sliding member was one in which 54 pieces of the white solid lubricants were charged and bonded to a high strength brass material having gold colour.

EXAMPLE X

As a solid lubricant powder material, 44% by weight of a soft metal (lead) powder and 16% by weight of PTFE were used; 10% by weight of a polyether ether ketone powder (same as Example IX) as a thermoplastic synthetic resin and 2% by weight of stearic acid as a carrier were added with the solid lubricant powder material by a mixer; and 8% by weight of a mineral oil as a lubricating oil (same as in Example VI) were mixed with the resultant mixture to obtain a mixture of lead, PTFE, the polyether ether ketone, stearic acid and the mineral oil.

Then, 17% by weight of a thermosetting liquid epoxy resin ("Technodyne AH604W" (trade name), manufactured by Taoka Kagaku Co.) as the thermosetting synthetic resin binder and 3% by weight of a powdery epoxy resin (same as in Example VI) were mixed with the thus-obtained mixture and then kneaded to obtain a solid lubricant having a wettability and a fluidity. The lubricating composition had gray colour.

The same high strength brass casting product as in Example VI was used as a metal substrate, it was fabricated into a cylindrical substrate having the same dimension and 54 apertures were formed so as to overlap to each other in the circumferential direction of the cylindrical substrate to form a sliding member material.

Subsequently, the solid lubricant-embedding sliding member (bearing bush) was obtained in the procedures as those in Example VI. The obtained sliding member was one in which 54 pieces of the gray solid lubricants were charged and bonded to a high strength brass material having gold colour.

Then, the results of tests for the bonding strength of the solid lubricant and the sliding characteristics of the sliding member regarding the solid lubricant and the sliding member composed of the solid lubricant obtained in the examples described above were set forth below.

(Bonding Strength Test)

For the bonding strength, a push-pull gauge was placed on the solid lubricant embedded into the apertures of the sliding member to measure the drawing-out force ($kgf/cm^2$) of the solid lubricant from the apertures and the bonding strength was expressed by the measured value.

(Sliding Property Test)

For the sliding property, a friction coefficient and an abrasion amount were measured under the following test conditions.

| (Test Conditions for the sliding member of Examples I to X) | |
|---|---|
| (1) Load: | 500 kgf/cm² |
| Speed: | 1 m/min |
| Mating member: | Carbon steel for machine structure use (S45C) |
| Reciprocating Sliding test: | Stroke 200 mm |
| Test cycle: | 100 × 10⁴ (400 km) |
| Lubrication: | No lubrication |
| (2) Load: | 10 kgf/cm² |
| Speed: | 40 m/min |
| Mating member: | Carbon steel for machine structure use (S45C) |
| Reciprocating Sliding test: | Stroke 200 mm |
| Test cycle: | 10 × 10⁴ (400 km) |
| Lubrication: | No lubrication |

The test results are shown in the following table.

TABLE 1

| | | Solid lubricant ingredient composition (wt %) | | | | Bonding strength (kgf/cm²) | Test condition (1) | | Test condition (2) | |
|---|---|---|---|---|---|---|---|---|---|---|
| | | Solid lubricant powder material | Carrier | Lubricating oil | Resin binder | | Friction co-efficient | Abrasion amount (mm) | Friction co-efficient | Abrasion amount (mm) |
| Example I | (1) | Artificial graphite: 53 | Hydrocarbon wax: 5 | Mineral oil: 15 | Epoxy resin: 27 | 62 | 0.09–0.10 | 0.008 | 0.07–0.09 | 0.008 |
| | (2) | Artificial graphite: 43 PTFE-10 | | | | 58 | 0.09–0.11 | 0.010 | 0.09–0.10 | 0.009 |
| | (3) | Artificial graphite: 43 MoS₂: 10 | | | | 60 | 0.10–0.11 | 0.012 | 0.09–0.11 | 0.010 |
| Example II | (1) | Expanded graphite: 40 | Higher fatty acid: 8 | Mineral oil: 15 | Epoxy resin: 35 | 50 | 0.10–0.12 | 0.009 | 0.09–0.10 | 0.009 |
| | (2) | Expanded graphite: 20 PTFE: 20 | | | | 60 | 0.10–0.11 | 0.008 | 0.09–0.11 | 0.010 |
| | (3) | Expanded graphite: 20 BN: 20 | | | | 58 | 0.11–0.13 | 0.011 | 0.10–0.12 | 0.010 |
| Example III | (1) | Artificial graphite: 35 | Super high molecular | Mineral oil: 20 | Epoxy resin: | 56 | 0.08–0.10 | 0.007 | 0.07–0.09 | 0.007 |
| | (2) | Artificial: 20 | | | | 55 | 0.08–0.11 | 0.008 | 0.08–0.10 | 0.008 |

TABLE 1-continued

| | | Solid lubricant ingredient composition (wt %) | | | Bonding strength (kgf/cm²) | Test condition (1) | | Test condition (2) | |
|---|---|---|---|---|---|---|---|---|---|
| | | Solid lubricant powder material | Carrier | Lubricating oil | Resin binder | | Friction co-efficient | Abrasion amount (mm) | Friction co-efficient | Abrasion amount (mm) |
| | (3) | PTFE: 15 Artificial graphite: 20 MoS$_2$: 15 | weight polyethylene: 7 Higher fatty acid amide: 3 | | 35 | 58 | 0.09–0.11 | 0.010 | 0.08–0.10 | 0.009 |
| Example IV | (1) | MoS$_2$: 70 | Hydrocarbon wax: 5 | Mineral oil: 7 | Epoxy resin: 18 | 55 | 0.10–0.12 | 0.011 | 0.09–0.11 | 0.010 |
| | (2) | MoS$_2$: 60 PTFE: 10 | | | | 50 | 0.10–0.11 | 0.010 | 0.09–0.10 | 0.010 |
| Example V | (1) | Artificial graphite: 53 | Porous styrene-divinyl benzene copolymer particles: 5 | Mineral oil: 15 | Epoxy resin: 27 | 60 | 0.09–0.10 | 0.008 | 0.07–0.09 | 0.008 |
| | (2) | Artificial graphite: 43 PTFE: 10 | | | | 56 | 0.09–0.11 | 0.010 | 0.09–0.10 | 0.010 |
| | (3) | Artificial graphite: 43 MoS$_2$: 10 | | | | 58 | 0.09–0.11 | 0.012 | 0.09–0.11 | 0.010 |

TABLE 2

| | Solid lubricant ingredient composition (wt %) | | | | Bonding strength (kgf/cm²) | Test condition (1) | | Test condition (2) | |
|---|---|---|---|---|---|---|---|---|---|
| | Solid lubricant powder material | Carrier | Lubricating oil | Thermoplastic resin & Resin binder | | Friction co-efficient | Abrasion amount (mm) | Friction co-efficient | Abrasion amount (mm) |
| Example VI | PTFE: 16 BN: 13 | Hydrocarbon wax: 4 | Mineral oil: 13 | Aromatic polyamide powder: 11 Epoxy resin: 43 | 58 | 0.08–0.10 | 0.008 | 0.07–0.09 | 0.007 |
| Example VII | PTFE: 16 BN: 13 | Hydrocarbon wax: 4 | Mineral oil: 13 | Polyamide powder: 11 Epoxy resin: 43 | 55 | 0.07–0.09 | 0.007 | 0.06–0.08 | 0.006 |
| Example VIII | PTFE: 16 BN: 13 | Hydrocarbon wax: 4 | Mineral oil: 13 | Aromatic polyamide fiber: 11 Epoxy resin: 43 | 60 | 0.09–0.10 | 0.009 | 0.08–0.10 | 0.008 |
| Example IX | Fluorinated graphite: 16 PTFE: 18 | Stearic acid: 4 | Mineral oil: 13 | Polyether ether ketone: 13 Epoxy resin: 36 | 50 | 0.10–0.11 | 0.012 | 0.09–0.10 | 0.008 |
| Example X | Soft metal: 44 PTFE: 16 | Stearic acid: 2 | Mineral oil: 8 | Polyether ether ketone: 10 Epoxy resin: 20 | 56 | 0.08–0.10 | 0.009 | 0.07–0.09 | 0.007 |

The sliding properties of the sliding members of Examples I to X in the low speed/high load region (under test conditions (1) above) in the appropriate application use for the solid lubricant-embedding sliding member, as well as in other application uses out of the low speed/high load region (under test conditions (2) above) were superior to those of the Comparative Example. In each of the sliding members of Examples I to X, the bonding strength between the lubricating composition and the aperture of the substrate was not less than 50 kgf/cm². Although the bonding strength of the solid lubricant of the Examples to the apertures in the sliding member (drawing-out force) showed lower values than those in Comparative example I, the solid lubricant in the Examples caused no troubles at all in using the sliding members, as seen from the results of the above sliding property test.

In the solid lubricant-embedded sliding member of Comparative Example I(1) in which graphite pellets were bonded to apertures with adhesives, the friction coefficient was gradually increased with lapse of test time in the test under the test condition (1) and the abrasion amount was abruptly increased at 300 km test stroke. Further, since the bearing temperature, friction coefficient and abrasion amount were increased abruptly at 1 km of the test stroke after the start of the test under the test conditions (2) above, the test was interrupted. The abrasion amount shown in Table 3 was a measured value at 300 km the test stroke.

The sliding member of Comparative Example I(2), in which graphite pellets were bonded to apertures with adhesives and grease was coated on the sliding surface, showed substantially the same performance as the sliding member of Example I through Example X in the test under the test conditions (1), but grease coated on the sliding surface began to be squeezed out to the sliding surface at the test stroke of 200 km and both of the friction coefficient and the abrasion amount increased abruptly at the test stroke of 300 km in the test under the test conditions (2) and, accordingly, subsequent test was interrupted. The abrasion amount shown in Table 3 was a measured value at 300 km the test stroke.

On the other hand, since the lubricating oil is contained in the solid lubricant of the Examples, it exhibited stable performance without additionally supplying a lubricant not only in the low speed/high load region (the test condition (1)) as the appropriate application use for the solid lubricant-embedding sliding member but also in other application uses out of the such region (the test condition (2)).

What is claimed is:

1. A lubricating composition for solid lubricant-embedded sliding members comprising 5 to 78% by weight of a solid lubricant powder material, 5 to 30% by weight of a lubricating oil which is in a liquid or paste form at an ordinary temperature, 1 to 15% by weight of a carrier for absorbing and retaining said lubricating oil, and 15 to 50% by weight of a thermosetting synthetic resin binder.

2. A lubricating composition according to claim 1, wherein the content of said carrier is 2 to 15% by weight.

3. A lubricating composition according to claim 1, wherein said lubricating oil is machine oil, engine oil, castor oil, ester oil, silicone oil, grease or mixtures thereof.

4. A lubricating composition according to claim 1, wherein said lubricating composition comprises 33 to 74% by weight of said solid lubricant powder material, 8 to 20% by weight of said lubricating oil, 3 to 12% by weight of said carrier, and 15 to 30% by weight of said thermosetting synthetic resin binder.

5. A lubricating composition according to claim 1, which further comprises 10 to 30% by weight of a thermoplastic synthetic resin.

6. A lubricating composition according to claim 5, wherein said lubricating composition comprises 5 to 60% by weight of said solid lubricant powder material, 5 to 20% by weight of said lubricating oil, 1 to 8% by weight of said carrier, 10 to 30% by weight of said thermoplastic synthetic resin, and 20 to 50% by weight of said thermosetting synthetic resin binder.

7. A lubricating composition according to claim 6, wherein said lubricating composition comprises 15 to 45% by weight of said solid lubricant powder material, 8 to 15% by weight of said lubricating oil, 1.6 to 6% by weight of said carrier, 10 to 20% by weight of said thermoplastic synthetic resin, and 25 to 43% by weight of said thermosetting synthetic resin binder.

8. A lubricating composition according to claim 5, wherein the thermoplastic synthetic resin is selected from the group consisting of aliphatic polyamide, aromatic polyamide, polyacetal, polyether ether ketone, polyphenylene sulfide, polybutylene terephthalate and oxybenzoyl polyester.

9. A lubricant embedded sliding member comprising a solid lubricant embedded into apertures or grooves of a metal substrate, said solid lubricant being obtained by flow-charging said lubricating composition defined in claim 1 into the apertures or grooves of the metal substrate and bonding the charged lubricating composition to said apertures or grooves of said metal substrate.

10. A lubricant embedded sliding member according to claim 9, wherein the sliding surface of the metal substrate formed with the apertures or grooves is a flat, cylindrical or spherical surface.

11. A lubricant-embedded sliding member according to claim 9, wherein the bonding strength between the solid lubricant and the metal substrate is not less than 50 kgf/cm$^2$.

12. A lubricating composition according to claim 1, wherein the thermosetting synthetic resin binder is selected from the group consisting of epoxy resin, phenol resin and phenoxy resin.

13. A lubricating composition according to claim 1, wherein the carrier is a paraffin wax having not less than 24 carbon atoms, an olefin wax having not less than 26 carbon atoms, an alkylbenzene having not less than 28 carbon atoms, a crystalline microcrystalline wax, a saturated fatty acid having not less than 14 carbon atoms, an unsaturated fatty acid having not less than 18 carbon atoms, a methyl or ethyl ester of a fatty acid having not less than 22 carbon atoms, an ester of a fatty acid having not less than 16 carbon atoms and a monohydric alcohol having not less than 15 carbon atoms, a mono- or di-glycerine ester of a fatty acid having not less than 13 carbon atoms, a triglyceride of a fatty acid having not less than 14 carbon atoms, palmitic acid amide, stearic acid amide, oleic acid amide, lithium stearate, calcium stearate, polyethylene, polypropylene, cellulose fibers, polypropylene fibers, porous spherical particles of styrene-divinylbenzene copolymer, porous calcium carbonate, phenol carbide resin, polyisobutylene, polybutadinene, styrene-butadiene copolymer rubber, ethylene-propylene copolymer rubber, ethylene-propylene terpolymer, polynorbornene synthetic elastomer or mixtures thereof.

14. A lubricating composition according to claim 1, wherein the carrier is a paraffin wax having not less than 24 carbon atoms, an olefin wax having not less than 26 carbon atoms, an alkylbenzene having not less than 28 carbon atoms, a crystalline microcrystalline wax, myristic acid, palmitic acid, stearic acid, arachic acid, montanic acid, octadecenic acid, parinanric acid, ethyl behenate, methyl tricosane, octadecyl stearate, 1,3-dilauric acid glyceride, monostearic acid glyceride, a triglyceride of a fatty acid having not less than 14 carbon atoms, palmitic acid amide, stearic acid amide, oleic acid amide, lithium stearate, calcium stearate, porous spherical particles of styrene-divinylbenzene copolymer or mixtures thereof.

15. A lubricating composition according to claim 1, wherein the solid lubricant powder material is at least one selected from the group consisting of graphite, fluorinated graphite, molybdenum disulfide, tungsten disulfide, boron nitride, calcium fluoride, polytetrafluoroethylene, lead, tin, lead-tin alloy, indium and metal soaps.

16. A lubricating composition according to claim 15, wherein the solid lubricant powder material is at least one selected from the group consisting of graphite, fluorinated graphite, molybdenum disulfide, boron nitride, polytetrafluoroethylene, lead, tin, lead-tin alloy and indium.

17. A lubricant-embedded sliding member comprising a metal substrate having apertures or grooves, and embedded into the apertures or grooves therein, a cured solid lubricating composition comprising 5 to 78% by weight of a solid lubricant powder material, 5 to 30% by weight of a lubricating oil which is in a liquid or paste form at an ordinary temperature, 1 to 15% by weight of a carrier for absorbing and retaining said lubricating oil, and 15 to 50% by weight of a thermosetting synthetic resin binder, in which said cured solid lubricating composition is bonded and attached to the metal substrate.

18. A lubricant-embedded sliding member according to claim 17, wherein the content of said carrier is 2 to 15% by weight.

19. A lubricant-embedded sliding member according to claim 17, wherein said lubricating oil is machine oil, engine oil, caster oil, ester oil, silicone oil, grease, or mixtures thereof.

20. A lubricant-embedded sliding member according to claim 17, wherein said lubricating composition comprises 33 to 74% by weight of said solid lubricant powder material, 8 to 20% by weight of said lubricating oil, 3 to 12% by weight of said carrier, and 15 to 30% by weight of said thermosetting synthetic resin binder.

21. A lubricant-embedded sliding member according to claim 17, which further comprises 10 to 30% by weight of a thermoplastic synthetic resin.

22. A lubricant-embedded sliding member according to claim 21, wherein said lubricating composition comprises 5 to 60% by weight of said solid lubricant powder material, 5 to 20% by weight of said lubricating oil, 1 to 8% by weight of said carrier, 10 to 30% by weight of said thermoplastic synthetic resin, and 20 to 50% by weight of said thermosetting synthetic resin binder.

23. A lubricant-embedded sliding member according to claim 22, wherein said lubricating composition comprises 15 to 45% by weight of said solid lubricant powder material, 8 to 15% by weight of said lubricating oil, 1.6 to 6% by weight of said carrier, 10 to 20% by weight of said thermoplastic synthetic resin, and 25 to 43% by weight of said thermosetting synthetic resin binder.

24. A lubricant-embedded sliding member according to claim 21, wherein the thermoplastic synthetic resin is selected from the group consisting of an aliphatic polyamide, aromatic polyamide, polyacetal, polyether ether ketone, polyphenylene sulfide, polybutylene terephthalate and oxybenzoyl polyester.

25. A lubricant-embedded sliding member according to claim 20, wherein the thermosetting synthetic resin binder is selected from the group consisting of epoxy resin, phenol resin and phenoxy resin.

26. A lubricant-embedded sliding member according to claim 17, wherein the carrier is a paraffin wax having not less than 24 carbon atoms, an olefin wax having not less than 26 carbon atoms, an alkylbenzene having not less than 28 carbon atoms, a crystalline microcrystalline wax, a saturated fatty acid having not less than 14 carbon atoms, an unsaturated fatty acid having not less than 18 carbon atoms, a methyl or ethyl ester of a fatty acid having not less than 22 carbon atoms, an ester of a fatty acid having not less than 16 carbon atoms and a monohydric alcohol having not less than 15 carbon atoms, a mono- or di-glycerine ester of a fatty acid having not less than 13 carbon atoms, a triglyceride of a fatty acid having not less than 14 carbon atoms, palmitic acid amide, stearic acid amide, oleic acid amide, lithium stearate, calcium stearate, polyethylene, polypropylene, cellulose fibers, polypropylene fibers, porous spherical particles of styrene-divinylbenzene copolymer, porous calcium carbonate, phenol carbide resin, polyisobutylene, polybutadinene, styrene-butadiene copolymer rubber, ethylene-propylene copolymer rubber, ethylene-propylene terpolymer, polynorbornene synthetic elastomer or mixtures thereof.

27. A lubricant-embedded sliding member according to claim 17, wherein the carrier is a paraffin wax having not less than 24 carbon atoms, an olefin wax having not less than 26 carbon atoms, an alkylbenzene having not less than 28 carbon atoms, a crystalline microcrystalline wax, myristic acid, palmitic acid, stearic acid, arachic acid, montanic acid, octadecenic acid, parinanric acid, ethyl behenate, methyl tricosane, octadecyl stearate, 1,3-dilauric acid glyceride, monostearic acid glyceride, a triglyceride of a fatty acid having not less than 14 carbon atoms, palmitic acid amide, stearic acid amide, oleic acid amide, lithium stearate, calcium stearate, porous spherical particles of styrene-divinylbenzene copolymer or mixtures thereof.

28. A lubricant-embedded sliding member according to claim 17, wherein the solid lubricant powder material is at least one selected from the group consisting of graphite, fluorinated graphite, molybdenum disulfide, tungsten disulfide, boron nitride, calcium fluoride, polytetrafluoroethylene, lead, tin, lead-tin alloy, indium and metal soaps.

29. A lubricant-embedded sliding member according to claim 28, wherein the solid lubricant powder material is at least one selected from the group consisting of graphite, fluorinated graphite, molybdenum disulfide, boron nitride, polytetrafluoroethylene, lead, tin, lead-tin alloy and indium.

30. A lubricant-embedded sliding member according to claim 17, wherein the bonding strength between the solid lubricant and the metal substrate is not less than 50 kgf/cm$^2$.

31. A metal substrate having at least one aperture or groove having retained therein a cured lubricating composition comprising 5 to 78% by weight of a solid lubricant powder material, 5 to 30% by weight of a lubricating oil which is in a liquid or paste form at an ordinary temperature, 1 to 15% by weight of a carrier for absorbing and retaining said lubricating oil, and 15 to 50% by weight of a thermosetting synthetic resin binder, wherein said lubricating composition is bonded and attached to the metal substrate.

* * * * *